(12) United States Patent
Sakurai

(10) Patent No.: US 10,502,108 B2
(45) Date of Patent: Dec. 10, 2019

(54) EXHAUST GAS PURIFICATION SYSTEM FOR CONSTRUCTION MACHINE

(71) Applicant: HITACHI CONSTRUCTION MACHINERY CO., LTD., Tokyo (JP)

(72) Inventor: Masatoshi Sakurai, Abiko (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/080,368

(22) PCT Filed: Mar. 10, 2017

(86) PCT No.: PCT/JP2017/009683
§ 371 (c)(1),
(2) Date: Aug. 28, 2018

(87) PCT Pub. No.: WO2018/025439
PCT Pub. Date: Feb. 8, 2018

(65) Prior Publication Data
US 2019/0024553 A1 Jan. 24, 2019

(30) Foreign Application Priority Data
Aug. 2, 2016 (JP) ................................. 2016-152334

(51) Int. Cl.
*B01D 53/94* (2006.01)
*F01N 3/20* (2006.01)
(Continued)

(52) U.S. Cl.
CPC ............... *F01N 3/04* (2013.01); *B01D 53/94* (2013.01); *B01D 53/9409* (2013.01); *E02F 9/00* (2013.01);
(Continued)

(58) Field of Classification Search
None
See application file for complete search history.

(56) References Cited

U.S. PATENT DOCUMENTS

2016/0273430 A1* 9/2016 Cole .................... F01N 3/2066

FOREIGN PATENT DOCUMENTS

| JP | 2000-264078 A | 9/2000 |
| JP | 2009-068395 A | 4/2009 |

(Continued)

OTHER PUBLICATIONS

International Preliminary Report on Patentability received in corresponding International Application No. PCT/JP2017/009683 dated Feb. 14, 2019.
(Continued)

*Primary Examiner* — Jelitza M Perez
(74) *Attorney, Agent, or Firm* — Mattingly & Malur, PC

(57) ABSTRACT

An exhaust gas purification system for a construction machine prevents deterioration of an aqueous urea solution remaining in a conduit of an aqueous urea solution replenishing circuit after replenishment. An aqueous urea solution return circuit returns, to an aqueous urea solution tank, an excessive aqueous urea solution that has not been injected from an aqueous urea solution injection device into the exhaust gas, and is provided with a first return conduit that connects the aqueous urea solution injection device to the aqueous urea solution tank and a second return conduit that connects the aqueous urea solution injection device to a conduit of an aqueous urea solution replenishing circuit. An injection valve opening pressure of a first check valve provided in the first return conduit is set higher than an injection valve opening pressure of a second check valve provided in the second return conduit.

3 Claims, 5 Drawing Sheets

(51) Int. Cl.
*F01N 3/04* (2006.01)
*E02F 9/00* (2006.01)
*F01N 3/08* (2006.01)
*E02F 9/20* (2006.01)

(52) U.S. Cl.
CPC ............ *F01N 3/08* (2013.01); *F01N 3/0814* (2013.01); *E02F 9/2025* (2013.01); *F01N 2260/024* (2013.01); *F01N 2570/14* (2013.01)

(56) References Cited

FOREIGN PATENT DOCUMENTS

| | | |
|---|---|---|
| JP | 2010-248944 A | 11/2010 |
| JP | 2016-084724 A | 5/2016 |

OTHER PUBLICATIONS

International Search Report of PCT/JP2017/009683 dated Apr. 4, 2017.

* cited by examiner

US 10,502,108 B2

EXHAUST GAS PURIFICATION SYSTEM FOR CONSTRUCTION MACHINE

TECHNICAL FIELD

The present invention relates to an exhaust gas purification system for a construction machine, and particularly relates to an exhaust gas purification system that injects a liquid reductant such as an aqueous urea solution into exhaust gas from an engine and that purifies NOx contained in the exhaust gas.

BACKGROUND ART

In a construction machine such as a hydraulic excavator, a diesel engine is mounted as a prime mover of a hydraulic pump; thus, the construction machine, like heavy trucks and motorcoaches, is equipped with an exhaust gas purification system for purifying nitrogen oxides (hereinafter, referred to as NOx) contained in exhaust gas from the engine. As such an exhaust gas purification system, there is known one configured such that an exhaust gas after-treatment device containing a reduction catalyst is installed in an exhaust pipe of the engine, an aqueous urea solution injection device is provided upstream of the reduction catalyst, an aqueous urea solution is injected from this aqueous urea solution injection device to generate ammonia in the exhaust gas, and a reduction reaction of NOx in the exhaust gas with ammonia on the reduction catalyst causes NOx to be decomposed into harmless water and nitrogen. An example of this system is disclosed in Patent Document 1.

Furthermore, in a construction machine such as a large hydraulic excavator, a fuel tank that stores a fuel is installed at a high position from the ground; thus, as disclosed in, for example, Patent Document 2, a refueling system for performing refueling from the ground is provided at a lower position than that of the fuel tank.

PRIOR ART DOCUMENT

Patent Document

Patent Document 1: JP-2009-068395-A
Patent Document 2: JP-2000-264078-A

SUMMARY OF THE INVENTION

Problem to be Solved by the Invention

In the construction machine such as a large hydraulic excavator, an aqueous urea solution tank that stores an aqueous urea solution necessary for a treatment on the exhaust gas from the engine is installed at a high position from the ground similarly to the fuel tank. Owing to this, similarly to a case of refueling from the ground, in a case of replenishing the aqueous urea solution tank with an aqueous urea solution from the ground, it is necessary to install an aqueous urea solution replenishment device at a lower position than that of the aqueous urea solution tank.

Applying a configuration of the refueling system to replenishment of the aqueous urea solution tank with the aqueous urea solution, however, poses the following problems.

The aqueous urea solution is supplied to the aqueous urea solution injection device from the aqueous urea solution tank. This aqueous urea solution tank, like the fuel tank, is installed at the high position in the construction machine. An aqueous urea solution replenishing circuit is connected to the aqueous urea solution tank, a conduit of an aqueous urea solution tank truck outside of the construction machine is connected to the aqueous urea solution replenishing circuit, and a pump of the aqueous urea solution tank truck is driven to supply the aqueous urea solution from the aqueous urea solution tank truck to the aqueous urea solution tank through the aqueous urea solution replenishing circuit. A conduit of the aqueous urea solution replenishing circuit is connected to the conduit of the aqueous urea solution tank truck by connecting an aqueous urea solution tank truck-side coupler to a construction machine-side coupler. The construction machine-side coupler is installed at a height at which an operator is accessible to the coupler. Owing to this, the conduit of the aqueous urea solution replenishing circuit has a large difference in height, so that urea remains in the conduit of the aqueous urea solution replenishing circuit after replenishment of the aqueous urea solution. The aqueous urea solution has a property to be prone to be deteriorated with an increase in water temperature. Owing to this, when the engine is started, the aqueous urea solution remaining in the conduit of the aqueous urea solution replenishing circuit is deteriorated by an influence of heat generated in the engine, a condenser, the fuel tank, a hydraulic fluid tank, and the like. At a time of next replenishment, the deteriorated aqueous urea solution enters the aqueous urea solution tank to degrade a quality of the aqueous urea solution, causing deterioration of an exhaust gas purification performance of the exhaust gas after-treatment device.

An object of the present invention is to provide an exhaust gas purification system for a construction machine that can prevent deterioration of an aqueous urea solution remaining in a conduit of an aqueous urea solution replenishing circuit after replenishing an aqueous urea solution tank with the aqueous urea solution due to an influence of heat generated in an engine, a hydraulic fluid tank, and the like.

Means for Solving the Problem

To attain the object, the present invention provides an exhaust gas purification system for a construction machine, including: an aqueous urea solution tank that is disposed in an upper swing structure of the construction machine; an aqueous urea solution injection device that injects an aqueous urea solution into exhaust gas from an engine; and an aqueous urea solution supply circuit in which an aqueous urea solution pump for supplying the aqueous urea solution from the aqueous urea solution tank to the aqueous urea solution injection device is disposed, wherein the exhaust gas purification system for the construction machine includes: an aqueous urea solution coupler that is provided at a lower position than a position of the aqueous urea solution tank and that is disposed outside of the construction machine; an aqueous urea solution replenishing circuit that replenishes the aqueous urea solution tank with the aqueous urea solution through the aqueous urea solution coupler; and an aqueous urea solution return circuit that returns, to the aqueous urea solution tank, an excessive aqueous urea solution that has not been injected from the aqueous urea solution injection device into the exhaust gas, wherein the aqueous urea solution return circuit includes: a first return conduit that connects the aqueous urea solution injection device to the aqueous urea solution tank; a second return conduit that connects the aqueous urea solution injection device to the aqueous urea solution replenishing circuit; a first check valve that is disposed in the first return conduit and that prevents a back flow of the aqueous urea solution;

and a second check valve that is disposed in the second return conduit and that prevents the back flow of the aqueous urea solution, and wherein an injection valve opening pressure of the first check valve is set higher than an injection valve opening pressure of the second check valve.

By providing the first check valve and the second check valve in the first return conduit and the second return conduit, respectively and setting the injection valve opening pressure of the first check valve higher than the injection valve opening pressure of the second check valve, during normal engine activation after replenishment, the second check valve at the low injection valve opening pressure is opened, and the excessive aqueous urea solution that has not been injected from the aqueous urea solution injection device into the exhaust gas after-treatment device is returned to the aqueous urea solution tank through the second return conduit of the aqueous urea solution return circuit and the conduit of the aqueous urea solution replenishing circuit. Therefore, the aqueous urea solution remaining in the conduit of the aqueous urea solution replenishing circuit after replenishing work is pressed by the excessive aqueous urea solution discharged from the aqueous urea solution injection device, and is returned to the aqueous urea solution tank. It is thereby possible to prevent the aqueous urea solution remaining in the conduit of the aqueous urea solution replenishing circuit after aqueous urea solution replenishing work from keeping left in the conduit 11 and from being deteriorated by an influence of heat generated in the engine, a hydraulic fluid tank that is not illustrated, and the like. It is thereby possible to prevent the deteriorated aqueous urea solution from entering the aqueous urea solution tank and degrading the quality of the aqueous urea solution, and to prevent deterioration of an exhaust gas purification performance of the exhaust gas after-treatment device.

Effect of the Invention

According to the present invention, it is possible to prevent the aqueous urea solution remaining in the conduit of the aqueous urea solution replenishing circuit after replenishing the aqueous urea solution tank with the aqueous urea solution from being deteriorated by the influence of heat generated in the engine, the hydraulic fluid tank, and the like, and it is thereby possible to prevent the deteriorated aqueous urea solution from entering the aqueous urea solution tank and degrading the quality of the aqueous urea solution, and to prevent deterioration of the exhaust gas purification performance of exhaust gas after-treatment device.

MODES FOR CARRYING OUT THE INVENTION

Embodiments of the present invention will be described hereinafter with reference to the drawings.
<First Embodiment>
~Configuration~

Figure 1:
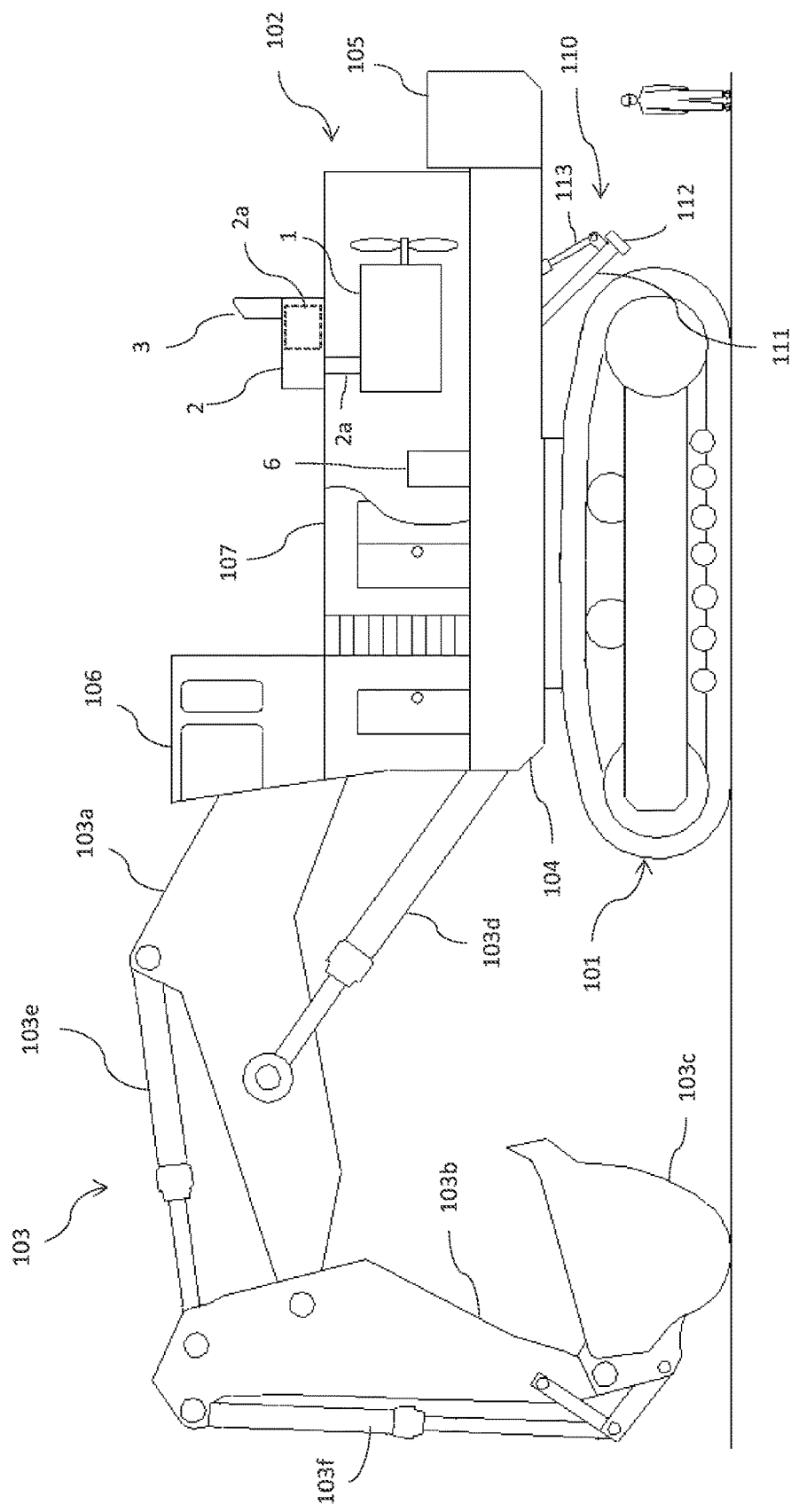
FIG. 1 is a diagram illustrating an overall configuration of a large hydraulic excavator including an exhaust gas purification system of the present invention.

FIG. 1 is a diagram illustrating an overall configuration of a large hydraulic excavator including an exhaust gas purification system of the present invention.

In FIG. 1, 100 denotes a large hydraulic excavator, and the large hydraulic excavator 100 (hereinafter, referred to as hydraulic excavator) includes a lower travel structure 101 for traveling and moving, an upper swing structure 102 swingably mounted in an upper portion of the lower travel structure 101, and a work device 103 provided in a front portion of the upper swing structure 102 in an elevatable manner. The work device 103 is a multijoint excavating device having a boom 103a, an arm 103b, and a bucket 103c, and is attached to a front portion side of a swing frame 104 that configures a base frame of the upper swing structure 102. A counterweight 105 is provided at a rear portion position of the swing frame 104 to be opposite to the work device 103 across a swing center of the upper swing structure 102. An operation room 106 is installed in a front portion of the swing frame 104, and a machine room building 107 is installed on the swing frame 104 in a range from a rear side of the operation room 106 to a front side of the counterweight 105. An engine 1 and devices such as a fuel tank, a hydraulic fluid tank, and a hydraulic pump that are not illustrated are installed in the machine room building 107. Furthermore, an exhaust gas after-treatment device 2 that purifies NOx contained in exhaust gas from the engine 1 is installed in an exhaust pipe 1a of the engine 1, and a muffler pipe 3 is connected to this exhaust gas after-treatment device 2.

The hydraulic excavator 100 drives the hydraulic pump by the engine 1, and supplies a hydraulic fluid delivered from the hydraulic pump to a plurality of actuators via a plurality of distributing valves provided in a hydraulic drive circuit, thereby driving these actuators. The plurality of actuators include a boom cylinder 103d, an arm cylinder 103e, and a bucket cylinder 103f that drive the boom 103a, the arm 103b, and the bucket 103c, respectively.

NOx contained in the exhaust gas discharged from the engine 1 is reduced to N2 and O2 in the exhaust gas after-treatment device 2 using a catalyst (reduction catalyst) 2a installed in the exhaust gas after-treatment device 2 with an aqueous urea solution injected from an aqueous urea solution injection device 4 (refer to FIG. 2) used as a reductant, and resultant N2 and O2 are discharged from the muffler pipe 3. An aqueous urea solution tank 6 from which the aqueous urea solution is supplied to the aqueous urea solution injection device 4 is installed in the machine room building 107 on the swing frame 104.

In a case of the large hydraulic excavator 100, a height from the ground to a lower surface of the upper swing structure 102 extends, for example, 2 m or longer. Owing to this, a centralized liquid supply system 110 that also functions as an aqueous urea solution replenishment device is provided on a lower surface of the swing frame 104 so that liquid supply work from the ground (work for supplying, onto the swing frame, various liquids that include a fuel of the engine 1, cooling water, and grease supplied to a slewing ring causing the upper swing structure 102 to swing with respect to the lower travel structure, or for discharging an old liquid to be replaced by another) can be carried out. This centralized liquid supply system 110 has a centralized liquid supply panel 112 that is rotatably connected to the swing frame via left and right rotary arms 111 (only the right rotary arm is illustrated), and a plurality of couplers connected to liquid supply objects on the swing frame 104 via a conduit are provided in the centralized liquid supply panel 112. During the liquid supply work, these couplers are detachably connected to a liquid supply hose of a liquid supply device disposed outside of the hydraulic excavator. In a case in which a liquid to be supplied is, for example, the fuel of the engine 1, a coupler of the fuel supply hose of a fuel tank truck is connected to a fuel supply coupler in the centralized liquid supply panel 112. A pump provided in the fuel tank truck is activated to pump the fuel, thereby supplying the fuel from the tank truck to the fuel tank on the swing frame 104 via the centralized liquid supply panel 112. A lifting cylinder 113 is attached to the rotary arms 111, and the lifting cylinder 113 is contracted at time other than the liquid supply work to move the centralized liquid supply panel 112 to an upper storage location not to disturb a swing operation of the upper swing structure 102.

Figure 2:
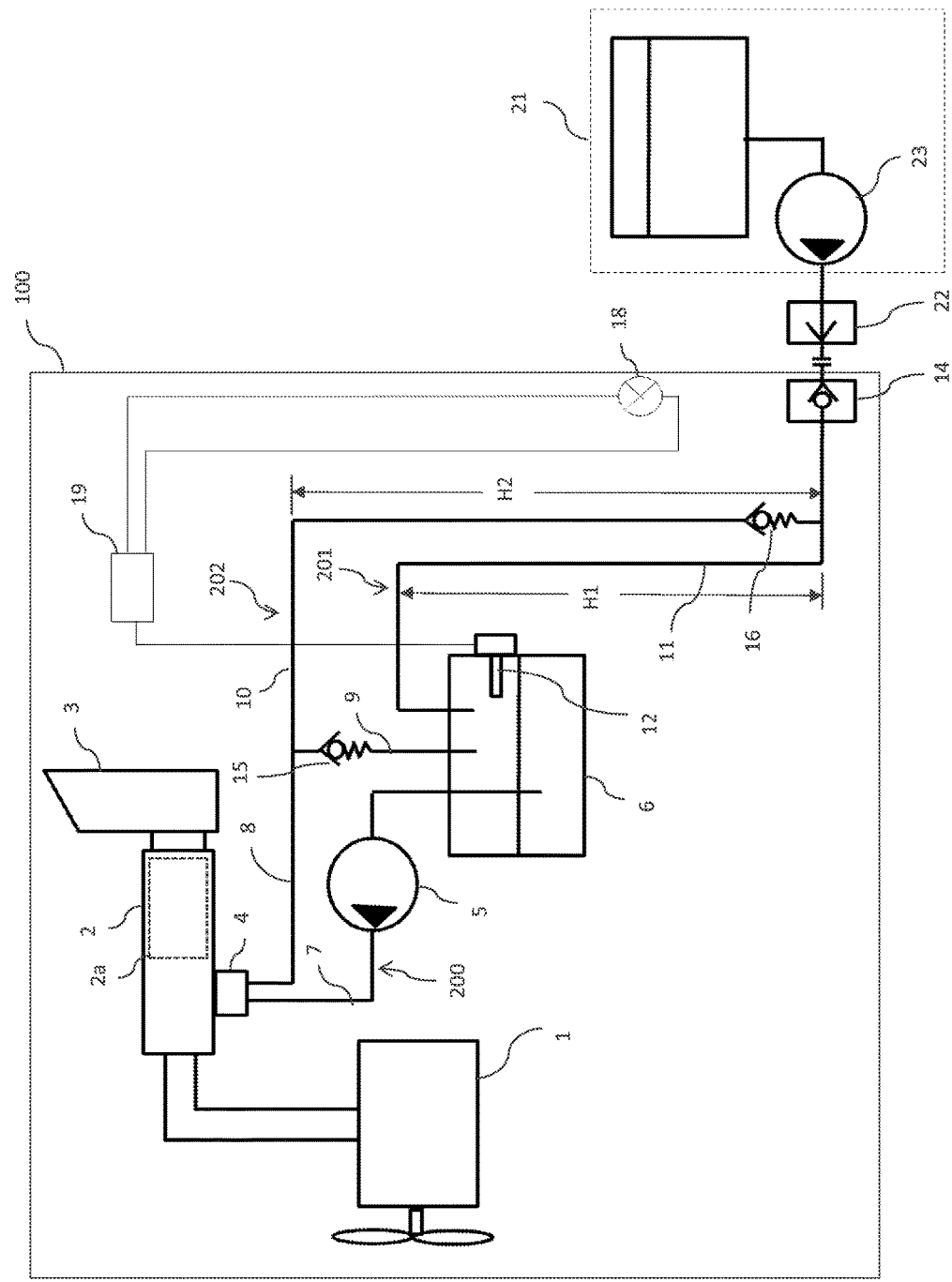
FIG. 2 is a diagram illustrating an overall configuration of an exhaust gas purification system according to a first embodiment of the present invention.

In the present embodiment, an aqueous urea solution coupler 14 (refer to FIG. 2) is provided in the centralized liquid supply panel 112, and this aqueous urea solution coupler 14 is connected to the aqueous urea solution tank 6 that stores the aqueous urea solution via a conduit 11 (refer to FIG. 2).

FIG. 2 is a diagram illustrating an overall configuration of an exhaust gas purification system according to the present embodiment.

In FIG. 2, the exhaust gas purification system according to the present embodiment includes the aqueous urea solution tank 6, the exhaust gas after-treatment device 2, the aqueous urea solution injection device 4, and the aqueous urea solution coupler 14 described above, an aqueous urea solution supply circuit 200 for supplying the aqueous urea solution from the aqueous urea solution tank 6 to the aqueous urea solution injection device 4, an aqueous urea solution replenishing circuit 201 for replenishing the aqueous urea solution tank 6 with the aqueous urea solution through the aqueous urea solution coupler 14, and an aqueous urea solution return circuit 202 that returns, to the aqueous urea solution tank 6, an excessive aqueous urea solution which has not been injected from the aqueous urea solution injection device 4 into the exhaust gas.

The aqueous urea solution supply circuit 200 has a conduit 7 (aqueous urea solution supply conduit) that connects the aqueous urea solution tank 6 to the aqueous urea solution injection device 4, and an aqueous urea solution pump 5 installed in this conduit 7.

The aqueous urea solution replenishing circuit 201 has the conduit 11 (aqueous urea solution replenishing conduit) that connects the aqueous urea solution tank 6 to the aqueous urea solution coupler 14. The aqueous urea solution coupler 14 can be connected to an aqueous urea solution coupler 22 of an aqueous urea solution tank truck 21 (aqueous urea solution supply device) disposed outside of the hydraulic excavator 100.

The aqueous urea solution return circuit 202 has a common return conduit 8 that is connected to the aqueous urea solution injection device 4, a first return conduit 9 that connects the aqueous urea solution injection device 4 to the aqueous urea solution tank 6 via the common return conduit 8, a second return conduit 10 that connects the aqueous urea solution injection device 4 to the conduit 11 of the aqueous urea solution replenishing circuit 201 via the common return conduit 8, a first check valve 15 that is disposed in the first return conduit 9 and that prevents a back flow of the aqueous urea solution, and a second check valve 16 that is disposed in the second return conduit 10 and that prevents the back flow of the aqueous urea solution. An injection valve opening pressure of the first check valve 15 is set higher than an injection valve opening pressure of the second check valve 16. A conduit part between a connection point, at which the conduit 11 of the aqueous urea solution replenishing circuit 201 is connected to the second return conduit 10, and the aqueous urea solution tank 6 constitutes part of the aqueous urea solution return circuit 202.

As described above, the aqueous urea solution coupler 14 is provided in the centralized liquid supply panel 112 that is attached to the swing frame 104 of the hydraulic excavator 100, and is at a position lower than that of the aqueous urea solution tank 6. As a result, the conduit 11 of the aqueous urea solution replenishing circuit 201 has a difference in height H1, and the second return conduit 10 of the aqueous urea solution return circuit 202 has a difference in height H2, thus providing a configuration such that the aqueous urea solution remains in the conduit 11 of the aqueous urea solution replenishing circuit 201 after replenishment of the aqueous urea solution.

Furthermore, the exhaust gas purification system according to the present embodiment includes a water level sensor 12 that detects that the aqueous urea solution tank 6 is in a full water level state, an aqueous urea solution replenishing lamp 18 that notifies an operator of the aqueous urea solution tank truck 21 that the aqueous urea solution tank 6 has turned into the full water level state, and a controller 19. The controller 19 controls the aqueous urea solution replenishing lamp 18 to be lit up on the basis of a signal from the water level sensor 12. The aqueous urea solution replenishing lamp 18 as well as the aqueous urea solution coupler 14 is provided in the centralized liquid supply panel 112 of the hydraulic excavator 100.

~Operations~

Figure 3:
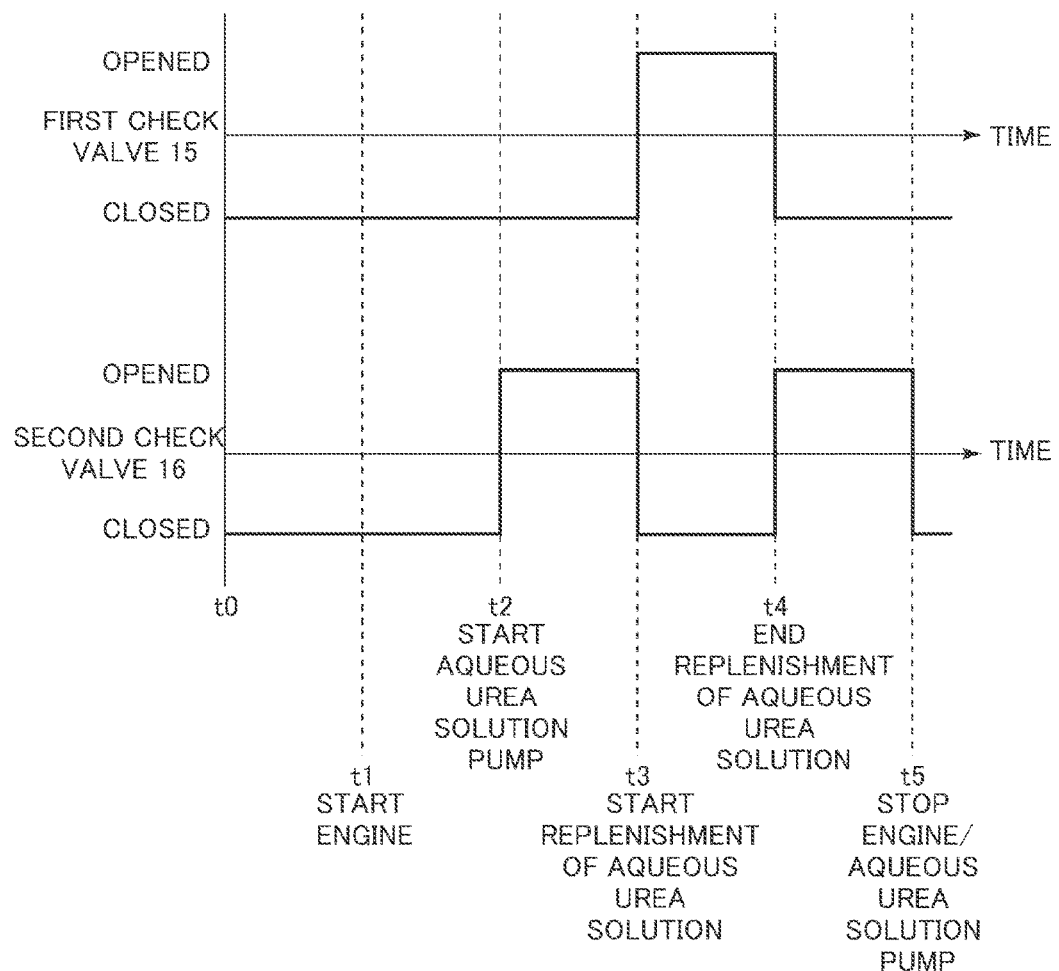
FIG. 3 is a timing chart illustrating operations for opening/closing first and second check valves.

FIG. 3 is a timing chart illustrating operations for opening/closing the first and second check valves 15 and 16. Operations of the exhaust gas purification system according to the present embodiment will be described using this timing chart.

<During Normal Engine Activation>

When an operator of the hydraulic excavator 100 turns on an engine key to activate the engine 1 (time t1), the aqueous urea solution pump 5 is activated after predetermined time (time t2). The predetermined time is a time for which it is checked whether the aqueous urea solution in the aqueous urea solution tank 6 is in a usable state such as whether the aqueous urea solution in the aqueous urea solution tank 6 is not frozen, and this check is performed by an engine controller, which is not illustrated, on the basis of a signal from a temperature sensor provided at the aqueous urea solution tank 6. When confirming that the aqueous urea solution is in a usable state, the engine controller activates an electric motor for the aqueous urea solution pump 5 to activate the aqueous urea solution pump 5.

Upon activation of the aqueous urea solution pump 5, the aqueous urea solution pump 5 supplies the aqueous urea solution in the aqueous urea solution tank 6 to the aqueous urea solution injection device 4 through the aqueous urea solution supply circuit 200, the aqueous urea solution injection device 4 injects the aqueous urea solution into the exhaust gas after-treatment device 2, and the exhaust gas discharged from the engine 1 is reduced to N2 and O2, thereby purifying the exhaust gas.

The excessive aqueous urea solution that has not been injected into the exhaust gas after-treatment device 2 is discharged from the aqueous urea solution injection device 4 to the aqueous urea solution return circuit 202. At this time, the injection valve opening pressure of the first check valve 15 is higher than the injection valve opening pressure of the second check valve 16; thus, a discharge pressure of the excessive aqueous urea solution discharged from the aqueous urea solution injection device 4 opens the second check valve 16 (time t2), and the excessive aqueous urea solution is returned to the aqueous urea solution tank 6 through the second return conduit 10, the second check valve 16, and the conduit 11 of the aqueous urea solution replenishing circuit 201.

<During Aqueous Urea Solution Replenishment 1—during Engine Activation>

The operator of the aqueous urea solution tank truck 21 connects the aqueous urea solution coupler 22 with which the aqueous urea solution tank truck 21 is equipped to the aqueous urea solution coupler 14 with which the centralized liquid supply panel 112 of the hydraulic excavator 100 is equipped, and activates a pump 23 in the aqueous urea solution tank truck 21 to start replenishing the aqueous urea solution tank 6 with the aqueous urea solution from the aqueous urea solution tank truck 21 through the aqueous urea solution replenishing circuit 201. At this time, the second check valve 16 provided in the second return conduit 10 of the aqueous urea solution return circuit 202 is closed by the aqueous urea solution pumped from the aqueous urea solution tank truck 21 (time t3), thereby preventing a back flow of the aqueous urea solution to the aqueous urea solution return circuit 202.

Moreover, the excessive aqueous urea solution that has not been injected into the exhaust gas after-treatment device 2 during engine activation is discharged to the aqueous urea solution return circuit 202. However, since the second check valve 16 on the second return conduit 10 of the aqueous urea solution return circuit 202 is closed by the aqueous urea solution pumped from the aqueous urea solution tank truck 21, a discharge pressure of the excessive aqueous urea solution discharged from the aqueous urea solution injection device 4 opens the first check valve 15 (time t3); thus, the aqueous urea solution is returned to the aqueous urea solution tank 6 through the second return conduit 10.

In a case in which the water level of the aqueous urea solution in the aqueous urea solution tank 6 has reached a preset full water level position (turned into a full water level state), the water level sensor 12 detects the full water level and transmits a signal to the controller 19. The controller 19 controls the aqueous urea solution replenishing lamp 18 to be lit up on the basis of the signal to notify the operator of the aqueous urea solution tank truck 21 that the aqueous urea solution tank 6 is in the full water level state. When the aqueous urea solution replenishing lamp 18 is lit up, the operator of the aqueous urea solution tank truck 21 stops the pump 23 to finish the aqueous urea solution replenishing work. When the aqueous urea solution replenishing work is finished, then the second check valve 16 turns into an openable state, the discharge pressure of the excessive aqueous urea solution discharged from the aqueous urea solution injection device 4 opens the second check valve 16 (time t4). At the same time, the first check valve 15 is closed, and the excessive aqueous urea solution is returned to the aqueous urea solution tank 6 through the second return conduit 10, the second check valve 16, and the conduit 11 of the aqueous urea solution replenishing circuit 201.

Subsequently, when the operator of the hydraulic excavator 100 turns off the engine key to stop the engine 1, then the aqueous urea solution pump 5 is also stopped, and the second check valve 16 is closed (time t5).

<During Aqueous Urea Solution Replenishment 2—during Engine Stop>

An operation of the aqueous urea solution replenishing circuit 201 during engine stop is the same as that of the aqueous urea solution replenishing circuit 201 "during aqueous urea solution replenishment 1—during engine activation." The operator of the aqueous urea solution tank truck 21 connects the aqueous urea solution coupler 22 to the aqueous urea solution coupler 14 of the hydraulic excavator 100, and activates the pump 23 in the aqueous urea solution tank truck 21, thereby replenishing the aqueous urea solution tank 6 with the aqueous urea solution from the aqueous urea solution tank truck 21 through the aqueous urea solution replenishing circuit 201.

Furthermore, in a case in which the aqueous urea solution tank 6 has turned into the full water level state, then the controller 19 controls the aqueous urea solution replenishing lamp 18 to be lit up, and the operator of the aqueous urea solution tank truck 21 stops the pump 23 to finish the aqueous urea solution replenishing work.

When the operator of the hydraulic excavator 100 then turns on the engine key to activate the engine 1 (time t1), the engine controller checks whether the aqueous urea solution in the aqueous urea solution tank 6 is in the usable state, and activates the electric motor of the aqueous urea solution pump 5 (time t2) after confirming that the aqueous urea solution is in the usable state. The aqueous urea solution injection device 4 injects the aqueous urea solution into the exhaust gas after-treatment device 2 to purify the exhaust gas discharged from the engine 1. At this time, the discharge pressure of the excessive aqueous urea solution discharged from the aqueous urea solution injection device 4 opens the second check valve 16 (time t2), and the aqueous urea solution remaining in the conduit 11 of the aqueous urea solution replenishing circuit 201 after the replenishing work is discharged from the aqueous urea solution injection device 4, pressed by the excessive aqueous urea solution discharged from the aqueous urea solution injection device 4 and passing through the second return conduit 10 and the second check valve 16, and returned to the aqueous urea solution tank 6.

~Effects~

As described so far, according to the present embodiment, during the normal engine activation after replenishment, the second check valve 16 at the low injection valve opening pressure is opened, and the excessive aqueous urea solution that has not been injected from the aqueous urea solution injection device 4 into the exhaust gas after-treatment device 2 is returned to the aqueous urea solution tank 6 through the second return conduit 10 of the aqueous urea solution return circuit 202 and the conduit 11 of the aqueous urea solution replenishing circuit 201; thus, the aqueous urea solution remaining in the conduit 11 of the aqueous urea solution replenishing circuit 201 after the replenishing work is pressed by the excessive aqueous urea solution discharged from the aqueous urea solution injection device 4 and returned to the aqueous urea solution tank 6. It is thereby possible to prevent the aqueous urea solution remaining in the conduit 11 of the aqueous urea solution replenishing circuit 201 after the aqueous urea solution replenishing work from keeping left in the conduit 11 and from being deteriorated by an influence of heat generated in the engine 1, the hydraulic fluid tank that is not illustrated, and the like. It is thereby possible to prevent the deteriorated aqueous urea solution from entering the aqueous urea solution tank 6 and to prevent deterioration of an exhaust gas purification performance of the exhaust gas after-treatment device 2.

<Second Embodiment>

Figure 4:
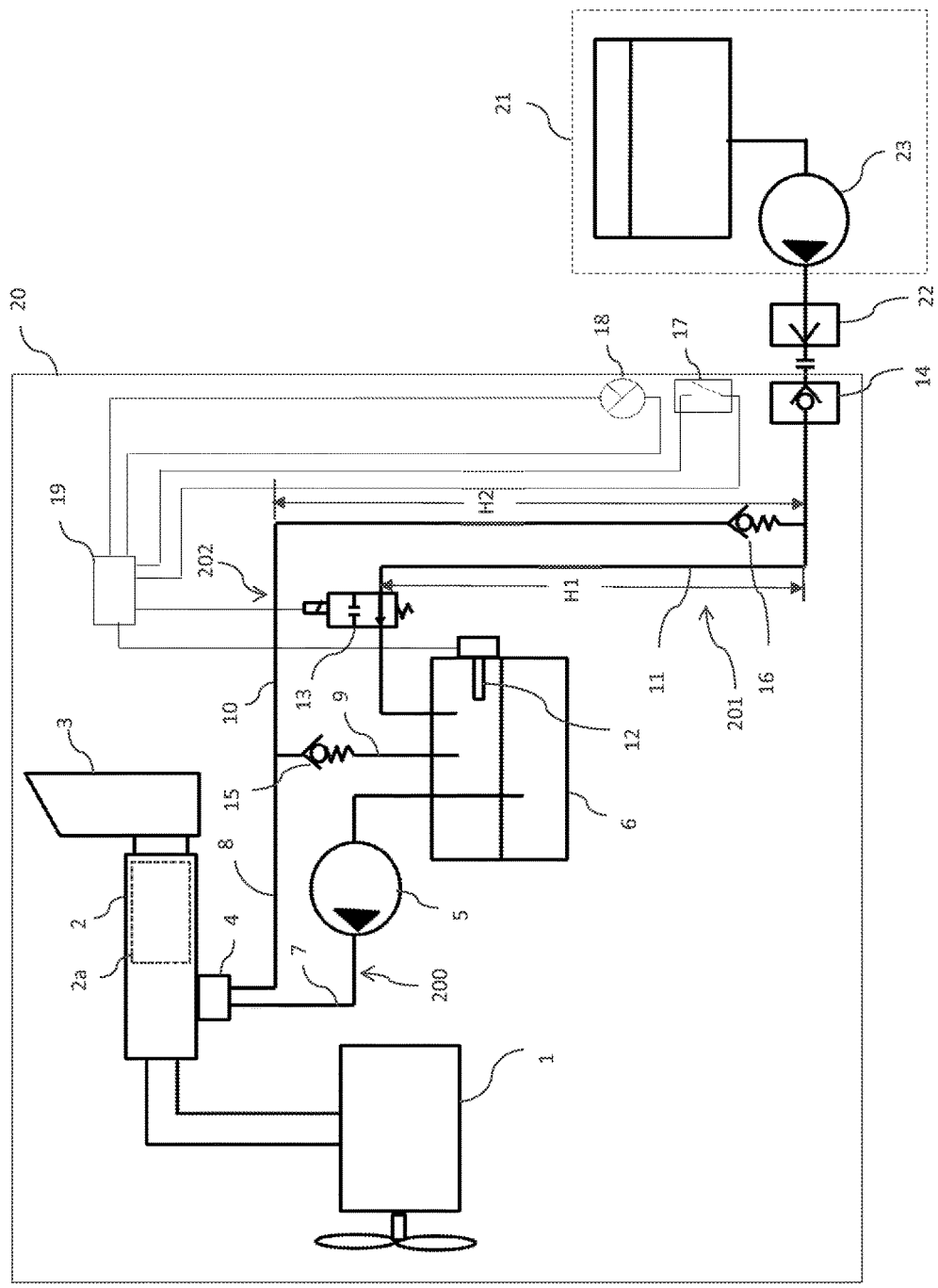
FIG. 4 is a diagram illustrating an overall configuration of an exhaust gas purification system according to a second embodiment of the present invention.

FIG. 4 is a diagram illustrating an overall configuration of an exhaust gas purification system according to a second embodiment of the present invention.

In FIG. 4, the exhaust gas purification system according to the present embodiment includes a solenoid on-off valve 13 and an aqueous urea solution replenishing switch 17 in addition to the configuration of the exhaust gas purification system according to the first embodiment.

The solenoid on-off valve 13 is installed in the conduit part between the connection point, at which the conduit 11 of the aqueous urea solution replenishing circuit 201 is connected to the second return conduit 10, and the aqueous urea solution tank 6. The solenoid on-off valve 13 is driven in response to a signal from the controller 19.

The aqueous urea solution replenishing switch 17 is used for the operator of the aqueous urea solution tank truck 21 to instructs to the controller 19 that aqueous urea solution replenishing work for replenishing the aqueous urea solution tank 6 with the aqueous urea solution is underway. When conducting the aqueous urea solution replenishing work, the operator of the aqueous urea solution tank truck 21 changes over the aqueous urea solution replenishing switch 17 from OFF to ON. When the aqueous urea solution replenishing switch 17 is turned on, an ON signal is outputted from the aqueous urea solution replenishing switch 17 to the controller 19.

Figure 5:
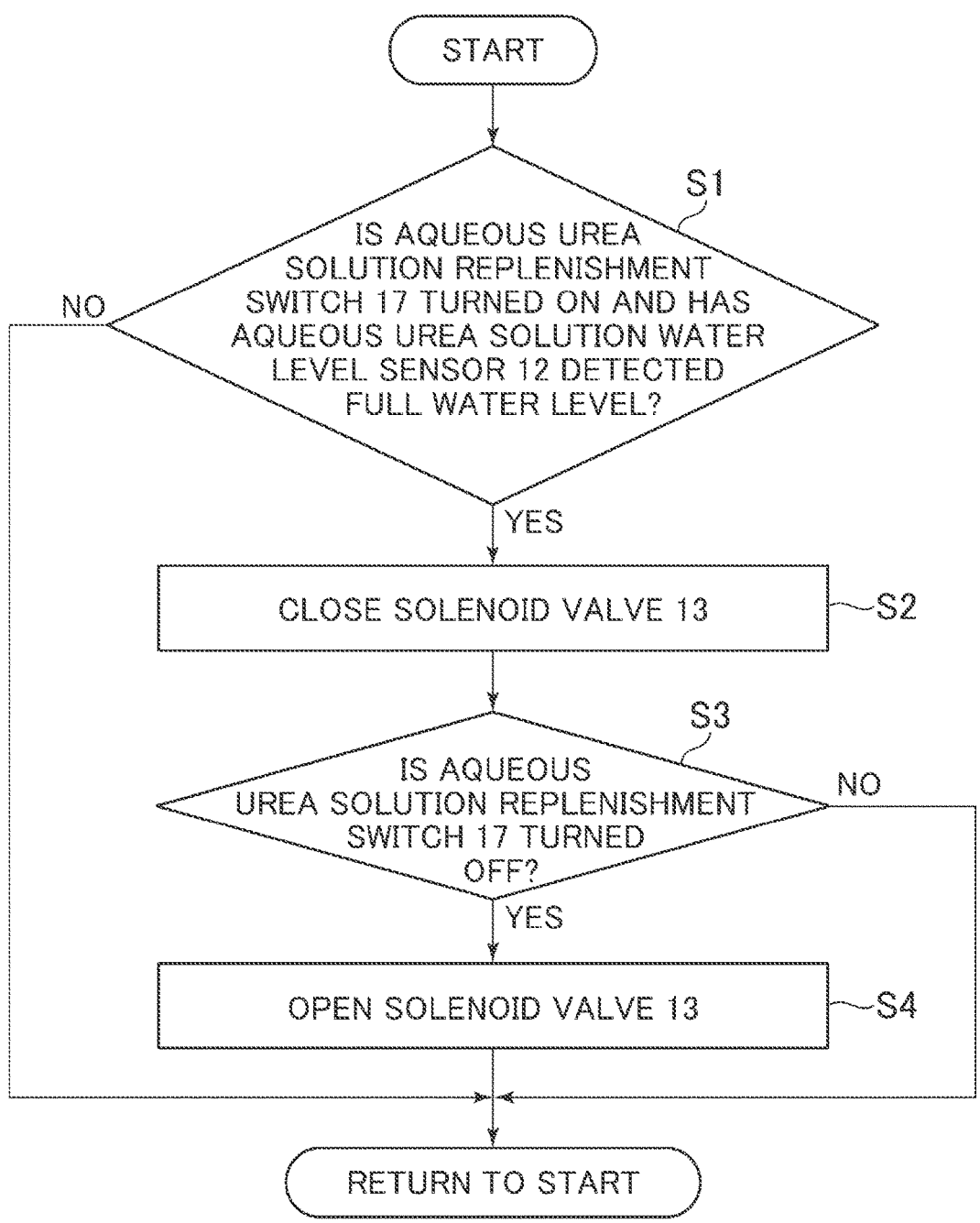
FIG. 5 is a flowchart illustrating a control function of a controller over a solenoid on-off valve.

FIG. 5 is a flowchart illustrating a control function of the controller 19 over the solenoid on-off valve 13.

The controller 19 determines whether the aqueous urea solution replenishing switch 17 is turned on and whether the water level sensor 12 has detected that the aqueous urea solution tank 6 is in the full water level state on the basis of signals from the aqueous urea solution replenishing switch 17 and the water level sensor 12 (Step S1). In a case in which the aqueous urea solution replenishing switch 17 is turned on (the aqueous urea solution replenishing work is underway) and the aqueous urea solution tank 6 has turned into the full water level state (a determination result of Step S1 is Yes), the controller 19 controls the solenoid on-off valve 13 to be closed (Step S2). In a case in which the aqueous urea solution replenishing switch 17 is not turned on or in which the aqueous urea solution tank 6 is not in the full water level state, the solenoid on-off valve 13 is kept at a valve opening position. Next, the controller 19 determines whether the aqueous urea solution replenishing switch 17 is turned off (Step S3). When the aqueous urea solution replenishing switch 17 is turned off (the aqueous urea solution replenishing work is not underway), the controller 19 controls the solenoid on-off valve 13 to be opened (Step S4).

Operations of the exhaust gas purification system according to the present embodiment will next be described.

<During Normal Engine Activation>

During the normal activation of the engine 1 during which the aqueous urea solution tank 6 is not replenished with the aqueous urea solution, the aqueous urea solution replenishing switch 17 is at an OFF position. Owing to this, the determination result of Step S1 in the flowchart of FIG. 5 is No, and the solenoid on-off valve 13 is opened. The operation of the exhaust gas purification system at this time is the same as the "during normal engine activation" according to the first embodiment.

<During Aqueous Urea Solution Replenishment 1—during Engine Activation>

During replenishment of the aqueous urea solution, the operator of the aqueous urea solution tank truck 21 turns on the aqueous urea solution replenishing switch 17 to instructs to the controller 19 that the aqueous urea solution replenishing work for replenishing the aqueous urea solution tank 6 with the aqueous urea solution is underway. At this time, the aqueous urea solution tank 6 is not in the full water level state; thus, the water level sensor 12 does not detect the full water level state of the aqueous urea solution tank 6. Owing to this, the determination result of Step S1 in the flowchart of FIG. 5 is No, and the solenoid on-off valve 13 is in an open state (the conduit 11 of the aqueous urea solution replenishing circuit 201 is in a communication state). As described in Section "during aqueous urea solution replenishment 1—during engine stop," the operator of the aqueous urea solution tank truck 21 connects the aqueous urea solution coupler 22 to the aqueous urea solution coupler 14 of the hydraulic excavator 100, and activates the pump 23 in the aqueous urea solution tank truck 21, thereby replenishing the aqueous urea solution tank 6 with the aqueous urea solution from the aqueous urea solution tank truck 21 through the conduit 11 of the aqueous urea solution replenishing circuit 201.

In the case in which the water level of the aqueous urea solution in the aqueous urea solution tank 6 has reached the preset full water level position, the water level sensor 12 detects the full water level and transmits a signal to the controller 19. At this time, the aqueous urea solution replenishing work is underway and the aqueous urea solution tank 6 is in the full water level state; thus, the determination result of Step S1 in the flowchart of FIG. 5 is Yes, and the controller 19 controls the solenoid on-off valve 13 to be closed. This can reliably and promptly stop replenishing the aqueous urea solution tank 6 with the aqueous urea solution. Furthermore, as described in Section "during aqueous urea solution replenishment 1—during engine stop" according to the first embodiment, the aqueous urea solution replenishing lamp 18 is lit up, and the operator of the aqueous urea solution tank truck 21 stops the pump 23 to finish the aqueous urea solution replenishing work.

Moreover, the operation of the aqueous urea solution return circuit 202 at this time is the same as the operation of the aqueous urea solution return circuit 202 according to the first embodiment; thus, the aqueous urea solution discharged from the aqueous urea solution injection device 4 is returned to the aqueous urea solution tank 6 through the second return conduit 10.

<During Aqueous Urea Solution Replenishment 2—during Engine Stop>

The operation of the aqueous urea solution replenishing circuit 201 during engine stop is the same as the "during aqueous urea solution replenishment 1—during engine stop" described above in the present embodiment, and the solenoid on-off valve 13 is opened. The operator of the aqueous urea solution tank truck 21 connects the aqueous urea solution coupler 22 to the aqueous urea solution coupler 14 of the hydraulic excavator 100, and activates the pump 23 in the aqueous urea solution tank truck 21, thereby replenishing the aqueous urea solution tank 6 with the aqueous urea solution from the aqueous urea solution tank truck 21 through the aqueous urea solution replenishing circuit 201.

In the case in which the aqueous urea solution tank 6 has turned into the full water level state, the water level sensor 12 detects the full water level state and transmits a signal to the controller 19. At this time, the aqueous urea solution replenishing work is underway and the aqueous urea solution tank 6 is in the full water level state; thus, the determination result of Step S1 in the flowchart of FIG. 5 is Yes, and the controller 19 controls the solenoid on-off valve 13 to be closed. This can reliably and promptly stop replenishing the aqueous urea solution tank 6 with the aqueous urea solution. Furthermore, as described in Section "during aqueous urea solution replenishment 1—during engine stop" according to the first embodiment, the aqueous urea solution replenishing lamp 18 is lit up, and the operator of the aqueous urea solution tank truck 21 stops the pump 23 to finish the aqueous urea solution replenishing work.

When the operator of the hydraulic excavator 100 then turns on the engine key to activate the engine 1, the engine controller checks whether the aqueous urea solution in the aqueous urea solution tank 6 is in the usable state, and activates the electric motor of the aqueous urea solution pump 5 after confirming that the aqueous urea solution is in the usable state. The aqueous urea solution injection device 4 injects the aqueous urea solution into the exhaust gas after-treatment device 2 to purify the exhaust gas discharged from the engine 1. At this time, the discharge pressure of the excessive aqueous urea solution discharged from the aqueous urea solution injection device 4 opens the second check valve 16, and the aqueous urea solution remaining in the conduit 11 of the aqueous urea solution replenishing circuit 201 after the replenishing work is discharged from the aqueous urea solution injection device 4, pressed by the excessive aqueous urea solution discharged from the aqueous urea solution injection device 4 and passing through the second return conduit 10 and the second check valve 16, and returned to the aqueous urea solution tank 6.

As described so far, the present embodiment can attain similar effects to those of the first embodiment. Furthermore, according to the present embodiment, when the aqueous urea solution tank 6 turns into the full water level state during replenishment of the aqueous urea solution, it is possible to reliably and promptly stop replenishing the aqueous urea solution tank 6 with the aqueous urea solution.

~Others~

Various modifications can be made of the embodiments described so far within the range of the spirit of the present invention.

For example, while the case in which the construction machine is the large hydraulic excavator has been described in the embodiments, the present invention may be applied to a construction machine other than hydraulic excavators, such as a hydraulic travelling crane, as long as the construction machine is a large construction machine.

DESCRIPTION OF REFERENCE CHARACTERS

1: Engine
2: Exhaust gas after-treatment device
2a: Reduction catalyst
3: Muffler pipe
4: Aqueous urea solution injection device
5: Aqueous urea solution pump
6: Aqueous urea solution tank
7: Conduit
8: Common return conduit
9: First return conduit
10: Second return conduit
13: Solenoid on-off valve
14: Aqueous urea solution coupler
15: First check valve
16: Second check valve
17: Aqueous urea solution replenishing switch
18: Aqueous urea solution replenishing lamp
19: Controller
21: Aqueous urea solution tank truck
22: Aqueous urea solution coupler
23: Pump
100: Large hydraulic excavator
200: Aqueous urea solution supply circuit
201: Aqueous urea solution replenishing circuit
202: Aqueous urea solution return circuit

The invention claimed is:

1. An exhaust gas purification system for a construction machine, comprising:
an aqueous urea solution tank that is disposed in an upper swing structure of the construction machine;
an aqueous urea solution injection device that injects an aqueous urea solution into exhaust gas from an engine; and
an aqueous urea solution supply circuit in which an aqueous urea solution pump for supplying the aqueous urea solution from the aqueous urea solution tank to the aqueous urea solution injection device is disposed, wherein
the exhaust gas purification system for the construction machine comprises:
an aqueous urea solution coupler that is provided at a lower position than a position of the aqueous urea solution tank and that is disposed outside of the construction machine;
an aqueous urea solution replenishing circuit that replenishes the aqueous urea solution tank with the aqueous urea solution through the aqueous urea solution coupler; and
an aqueous urea solution return circuit that returns, to the aqueous urea solution tank, an excessive aqueous urea solution that has not been injected from the aqueous urea solution injection device into the exhaust gas,
the aqueous urea solution return circuit includes:
a first return conduit that connects the aqueous urea solution injection device to the aqueous urea solution tank;
a second return conduit that connects the aqueous urea solution injection device to the aqueous urea solution replenishing circuit;
a first check valve that is disposed in the first return conduit and that prevents a back flow of the aqueous urea solution; and
a second check valve that is disposed in the second return conduit and that prevents the back flow of the aqueous urea solution, and
an injection valve opening pressure of the first check valve is set higher than an injection valve opening pressure of the second check valve.

2. The exhaust gas purification system for the construction machine according to claim 1, wherein
the aqueous urea solution replenishing circuit includes: an aqueous urea solution replenishing conduit that connects the aqueous urea solution tank to the aqueous urea solution coupler; and a solenoid valve provided in the aqueous urea solution replenishing conduit, and
the exhaust gas purification system for the construction machine further comprises:
an aqueous urea solution replenishing switch that instructs that aqueous urea solution replenishing work for replenishing the aqueous urea solution tank with the aqueous urea solution is underway;

a water level sensor that detects a water level of the aqueous urea solution tank; and a controller that determines whether the aqueous urea solution replenishing work is underway and whether the aqueous urea solution tank has turned into a full water level state on the basis of signals from the aqueous urea solution replenishing switch and the water level sensor, that controls the solenoid valve to be closed in a case in which the aqueous urea solution replenishing work is underway and in which the aqueous urea solution tank has turned into the full water level state, and that controls the solenoid valve to be opened after end of the aqueous urea solution replenishing work.

3. The exhaust gas purification system for the construction machine according to claim 1, further comprising:

a water level sensor that detects a water level of the aqueous urea solution tank; and an aqueous urea solution replenishing lamp that notifies an operator that the aqueous urea solution tank has turned into the full water level state; and a controller that controls the aqueous urea solution replenishing lamp to be lit up in a case in which the aqueous urea solution tank has turned into the full water level on the basis of a signal from the water level sensor.

* * * * *